Feb. 18, 1964 F. G. WILLARD ETAL 3,121,842

ALTERNATE SIGNAL PROVIDING APPARATUS COMPRISING LOGIC ELEMENTS

Filed July 13, 1959 2 Sheets-Sheet 1

WITNESSES

Edwin L. Bassler

James F. Young

INVENTORS
Frank DiNicolantonio
& Frank G. Willard
BY R.W. Brodahl
ATTORNEY

Feb. 18, 1964 F. G. WILLARD ETAL 3,121,842

ALTERNATE SIGNAL PROVIDING APPARATUS COMPRISING LOGIC ELEMENTS

Filed July 13, 1959 2 Sheets-Sheet 2

United States Patent Office 3,121,842

Patented Feb. 18, 1964

3,121,842
ALTERNATE SIGNAL PROVIDING APPARATUS COMPRISING LOGIC ELEMENTS

Frank G. Willard, Clarence, and Frank Di Nicolantonio, Williamsville, N.Y., assignors to Westinghouse Electric Corporation, East Pittsburgh, Pa., a corporation of Pennsylvania Filed July 13, 1959, Ser. No. 826,569
11 Claims. (Cl. 328—57)

The present invention relates in general to control signal providing apparatus, and more particularly to control signal providing apparatus operative to supply at least two output control signals or pulses of respectively different polarity for controlling the operation of a signal counter or like device.

It is an object of the present invention to provide improved signal providing apparatus operative to provide at least two output signals of respectively opposite polarity and such that at least one of said output signals is always present.

It is a further object of the present invention to provide improved signal providing apparatus for providing alternate output signals of sufficient power to drive a multiple number of subsequent signal counter stages, such that a count indication progresses through successive odd and even stages without ambiguity in said count indication due to at least one of said output signals not being provided.

It is a different object of the present invention to provide improved pulse signal providing apparatus for providing successive output pulses or signals of respectively different polarities or phases, and which can be readily inhibited regarding a change of said output pulses without the loss of at least one of said output pulses.

It is an additional object to provide improved pulse signal providing apparatus better operative to provide output pulses of respectively different pulse characteristics for controlling the operation of a subsequent pulse utilizing device with resultant improved reliability in the operation of said pulse utilizing device.

These and other objects and advantages of the present invention will become still more apparent from a study of the following description taken in conjunction with the drawings wherein.

Figure 1:
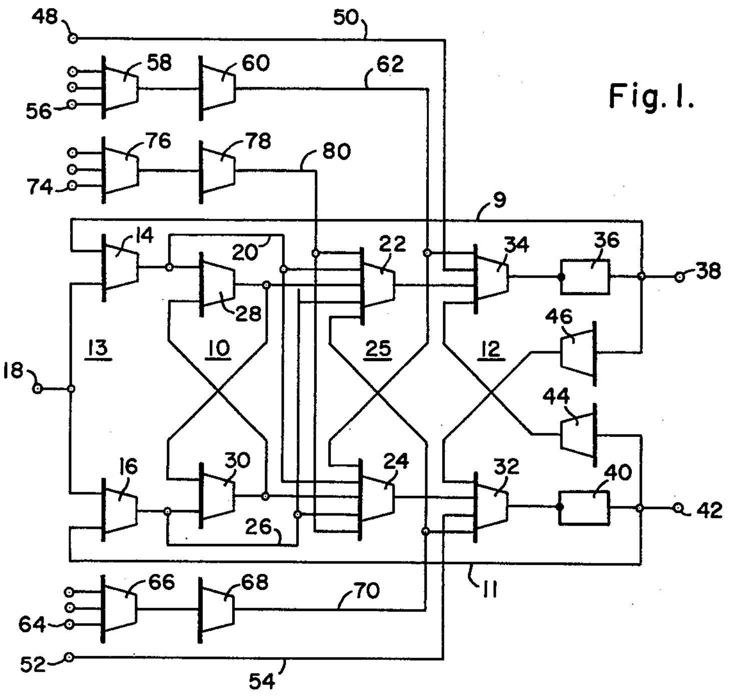
FIG. 1 is a schematic showing of the pulse signal providing apparatus in accordance with the teachings of the present invention.

The pulse signal providing apparatus shown in FIG. 1 includes a first MEMORY device 10 and a second MEMORY device 12. A gate circuit 13 including a NOR element 14 and a NOR element 16 is operative to control the operation of the MEMORY device 10. In this regard, a one value control pulse supplied to input terminal 18 is operative to prevent an output signal from each of the NOR elements 14 and 16. The output of the NOR element 14 is connected through conductor 20 to one input of each of the NOR elements 22 and 24 in a gate circuit 25 for controlling the operation of the MEMORY device 12. Thus, when a one value control signal is supplied to the terminal 18, which signal causes each of the NOR elements 14 and 16 not to provide a one value output signal, this results in the removal of any one value output signal supplied by the NOR element 14 to the conductor 20 and similarly this results in the removal of any such output signal supplied by the NOR element 16 to a conductor 26 connected to one input of each of the NOR elements 22 and 24. Thusly, a one value output signal is supplied by one of the NOR elements 28 or 30 within the MEMORY device 10 to one of the respective NOR elements 22 and 24. For example, if the NOR element 28 is providing a one value output signal due to the feedback connections 9 and 11 from the respective NOR elements 36 and 40, when the one value control signals are removed from one of the respective conductors 20 and 26, this allows the output signal from the NOR element 28 to cause the NOR element 22 to not provide a one value output signal. It further allows the absence of such a control signal from the NOR element 30 to cause the NOR element 24 to provide a one value output signal. The latter output signal so provided by the NOR element 24 is supplied to the input of the NOR element 32 within the MEMORY device 12. Further, the absence of a one value output signal from the NOR element 22 allows the NOR element 34 within the MEMORY device 12 to provide such an output signal.

The output signal from the latter NOR element 34 is applied to one input of a signal inversion device 36, which could be a well known NOT device or it may comprise a NOR element having a high power output signal. This output signal from the NOR element 34 causes the inversion device 36 to not have a one value output signal in its output operative with the output terminal 38. The absence of such an output signal from the NOR element 32, however, allows the inversion device 40 to provide a one value output signal to its output terminal 42. This output signal from the latter inversion device 40 is operative with a NOR element 44 for causing said NOR element 44 not to have a one value output signal as applied to an input of the NOR element 34. Similarly, the lack of such an output signal from the inversion device 36 allows the NOR element 46 to supply a one value output signal to one input of the NOR element 32, thusly holding the NOR element 32 in its zero output signal state of operation whereas the lack of a one output signal from the NOR element 44 allows the NOR element 34 to continue to provide such an output signal to the inversion device 36.

It may be desired to reset the signal providing apparatus shown in FIG. 1 such that the apparatus supplies a one value output control signal to cause a subsequent signal utilizing device, such as the ring counter shown in FIG. 2 and to be later described, to shift its operation for example from an even stage to an odd stage for resetting the ring counter to an odd stage condition of operation. A one value control signal may be supplied to an input terminal 48 operative with a conductor 50 connected to one input of the NOR element 34 causing the NOR element 34 to no longer provide such an output signal such that the inversion device 36 does provide a one value output signal. The latter output signal from the inversion device 36 is operative with the NOR element 46 such that the NOR element 46 no longer provides a one value output signal to an input of the NOR element 32 thereby causing the NOR element 32 to provide such an output signal. The latter output signal from the NOR element 32 causes the inversion device 40 to not provide a one value output signal to the terminal 42. Thusly, a one value control signal is supplied to the terminal 38 resulting from the application of the one value control signal to the terminal 48 and no such control signal is supplied to the terminal 42. It is the lack of this control signal supplied to the terminal 42 which causes the ring counter to be subsequently described to shift its operation from an odd stage to an even stage of operation as will be later explained.

Similarly, the pulse or signal providing apparatus as shown in FIG. 1 can be reset to thereby reset the subsequent pulse utilization device to an even condition of operation by applying a one value control pulse or signal to the input terminal 52 operative with a conductor 54 connected to an input of the NOR element 32 within the MEMORY device 12. The latter control pulse causes the NOR element 32 to not have a one value output signal such that the inversion device 40 does provide such an output signal to the terminal 42. The latter output signal from the inversion device 40 is operative with a NOR element 44 such that the NOR element 44 no longer provides a one value output signal. This allows the NOR element 34 to provide such an output signal. The latter output signal from the NOR element 34 is operative with the inversion device 36 such that the inversion device 36 does not provide a one value output signal to the terminal 38. The latter lack of such an output signal causes the pulse counter to shift its operation as will be later described.

If it is desired to advance the operating condition of the subsequent pulse counter driven by the pulse or signal providing apparatus as shown in FIG. 1, a suitable one value control signal can be supplied to a terminal 56 operative with NOR elements 58 and 60 and a conductor 62 for thereby providing such a control signal to one input of the NOR element 34 and one input of the NOR element 24. This causes the NOR element 34 to not provide a one value output signal thereby allowing the inversion device 36 to provide a one value output signal to the output terminal 38, the NOR elements 24 and 32 cause the inversion device not to have such an output signal for causing a shift of information stored within the subsequent pulse counter from an even stage to an odd stage of the pulse counter. This one value control pulse or signal as applied to the NOR element 24 causes the NOR element 24 not to have such an output signal which allows the NOR element 32 within the MEMORY device 12 to provide a one value output signal. The latter output signal of the NOR element 32 causes the inversion device 40 to not provide a one value output signal to the terminal 42.

If it is desired to advance the information stored within the subsequent pulse counter controlled by the pulse signal providing apparatus as shown in FIG. 1 from an odd stage to an even stage, a suitable one value control signal may be supplied to an input terminal 64 operative with NOR elements 66 and 68 and conductor 70 for providing a similar control signal to one input of the NOR element 32 within the MEMORY device 12 and similarly to provide the same control signal to one input of the NOR element 22. This control signal causes the NOR element 32 not to provide a one value output signal to in turn allow the inversion device 40 to supply such an output signal to the terminal 42. The control signal supplied to the NOR element 22 causes the NOR element 22 to not provide a one value output signal to in turn allow the NOR element 34 to provide such an output signal. The output signal from the NOR element 34 causes the inversion device 36 to not supply a one value output signal to the terminal 38, and this in turn causes the pulse counter to shift its operation as will be later described.

If it is desired to inhibit the effect of signals applied to input terminal 18 and thusly the pulse signal providing apparatus as shown in FIG. 1, a suitable one value control signal may be applied to an input terminal 74 operative with NOR elements 76 and 78 to provide a similar control signal through the conductor 80 to an input of each of the NOR elements 22 and 24. This causes each of the NOR elements 22 and 24 to not provide a one value output signal and inhibits any control signals, received from either one of the NOR elements 28 and 30 within the MEMORY device 10 and resulting from a one value control signal being supplied to the terminal 18, for changing the operative state of the MEMORY device 12. In other words, a one value control signal supplied to the terminal 74 locks the operation of the NOR elements 22 and 24 such that a "step upon one" operation otherwise resulting from the application of a one value control pulse to the terminal 18 is not effective for changing the operative state of the MEMORY device 12.

Figure 2:
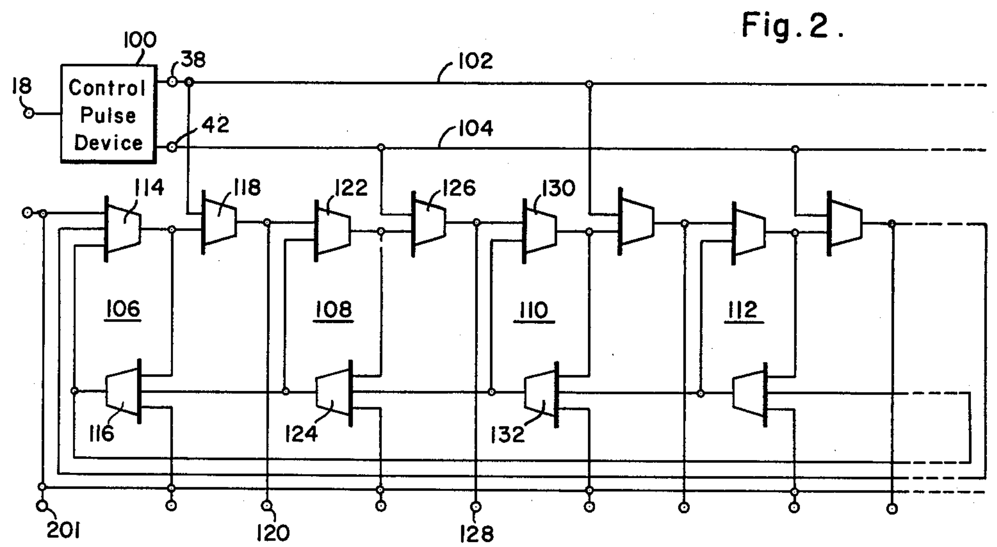
FIG. 2 is a schematic showing of an illustrative pulse ring counter operative with the signal providing apparatus shown in FIG. 1.

In FIG. 2, there is shown a control pulse driver device 100, which may comprise the pulse signal providing apparatus as shown in FIG. 1 and operative to supply output signals to one of the terminals 38 or 42. The terminal 38 is operative with a conductor 102 and the terminal 42 is operative with a conductor 104. The "step upon one" input terminal 18 is shown for purposes of illustration.

In this regard it should be noted that the pulse counter apparatus as shown in FIG. 2 is described in greater detail in abandoned application entitled "Pulse Counter Device" by F. G. Willard, Serial No. 826,777 filed July 13, 1959, and assigned to the same assignee as is the present application.

The pulse counter as shown in FIG. 2 includes a first MEMORY device or counting stage 106, a second MEMORY device or counting stage 108, a third counting stage 110, and a fourth counting stage 112. Any suitable additional number of counting stages may be provided as may be desired. In the operation of the pulse counter apparatus as shown in FIG. 2, the first counting stage 106 is operative initially in its ON condition of operation such that its NOR element 114 does not have a one value output signal and the NOR element 116 does have a one value output signal. The remaining stages of the pulse counter apparatus as shown in FIG. 2 are operative initially in an OFF condition of operation such that the uppermost NOR element as shown in FIG. 2 is providing an output signal and the lowermost NOR element for the respective stages is not providing an output signal. Connected between each of the respective counting stages is a control gate. The control gate 118 is so connected between the first counting stage 106 and the second counting stage 108 in this regard.

When a step upon one control signal is applied to the terminal 18, the control pulse driver device 100 for example, causes an output signal to be supplied to the terminal 42 and thereby the even to odd control conductor 104 and removes the control signal from the terminal 38 and thereby the odd to even control conductor 102. The removal of the control signal from the conductor 102 removes the same control signal from one input of the NOR element 118. Since the NOR element 114 is already operating with no output signal the NOR element 118 has each of its inputs not energized by control signals and thusly, it provides an output signal to an output terminal 120 and also to one input of a NOR element 122 within the second counting stage 108. This causes the NOR element 122 to not have an output signal and causes the companion NOR element 124 to provide an output signal. The control signal supplied to the conductor 104 is during this period of time supplied to one input of the NOR element 126 operative as a control gate in the output of the second stage 108 and connected between the second stage 108 and the third stage 110. Thusly, when the NOR element 122 no longer has an output signal, this information is not passed on to the third stage 110 due to the operation of the control gate NOR element 126 blocking this information transfer.

When the NOR element 124 provides an output signal, this is applied to one input of the NOR element 116 within the first counting stage 106, such that the NOR element 116 no longer provides an output signal causing the NOR element 114 to provide an output signal and thereby terminating the output signal supplied by the NOR element 118. The first counting stage 106 is now in its OFF Condition of operation, and the counting stage 108 is in its ON condition of operation. When a second step upon one control signal is applied to the input terminal 18 of the pulse driver device 100, the pulse driver device 100 is operative to supply an output signal to the terminal 38 and thereby the conductor 102 and to remove its output signal from the terminal 42 and thereby the conductor 104. This results in a removal of the control signal from one input of the NOR element 126 such that the NOR element 126 now has no control signal supplied to either of its inputs and it, in turn, provides an output signal to the output terminal 128. This output signal is further supplied to one input of the NOR element 130 within the third counting stage to result in the NOR element 130 to no longer provide an output signal and the companion NOR element 132 to now provide an output signal. The latter output signal is applied to the NOR element 124 causing it to no longer provide an output signal and this causes the NOR element 122 to instead provide an output signal, thusly, terminating the output signal supplied by the control gate NOR element 126.

The successive counting stages of the pulse counter apparatus as shown in FIG. 2 are operative in a manner similar to that previously described relative to the transfer of stored pulse information from the counting stage 106 to the second counting stage 108 and then from the second counting stage to the third counting stage 110. Information is transferred to the fourth counting stage 112 from the third counting stage 110 when the conductor 102 does not receive an output signal and the output signal is supplied to the conductor 104 for blocking the transfer of information from the fourth stage 112 to the next successive stage as may be provided.

Figure 3:
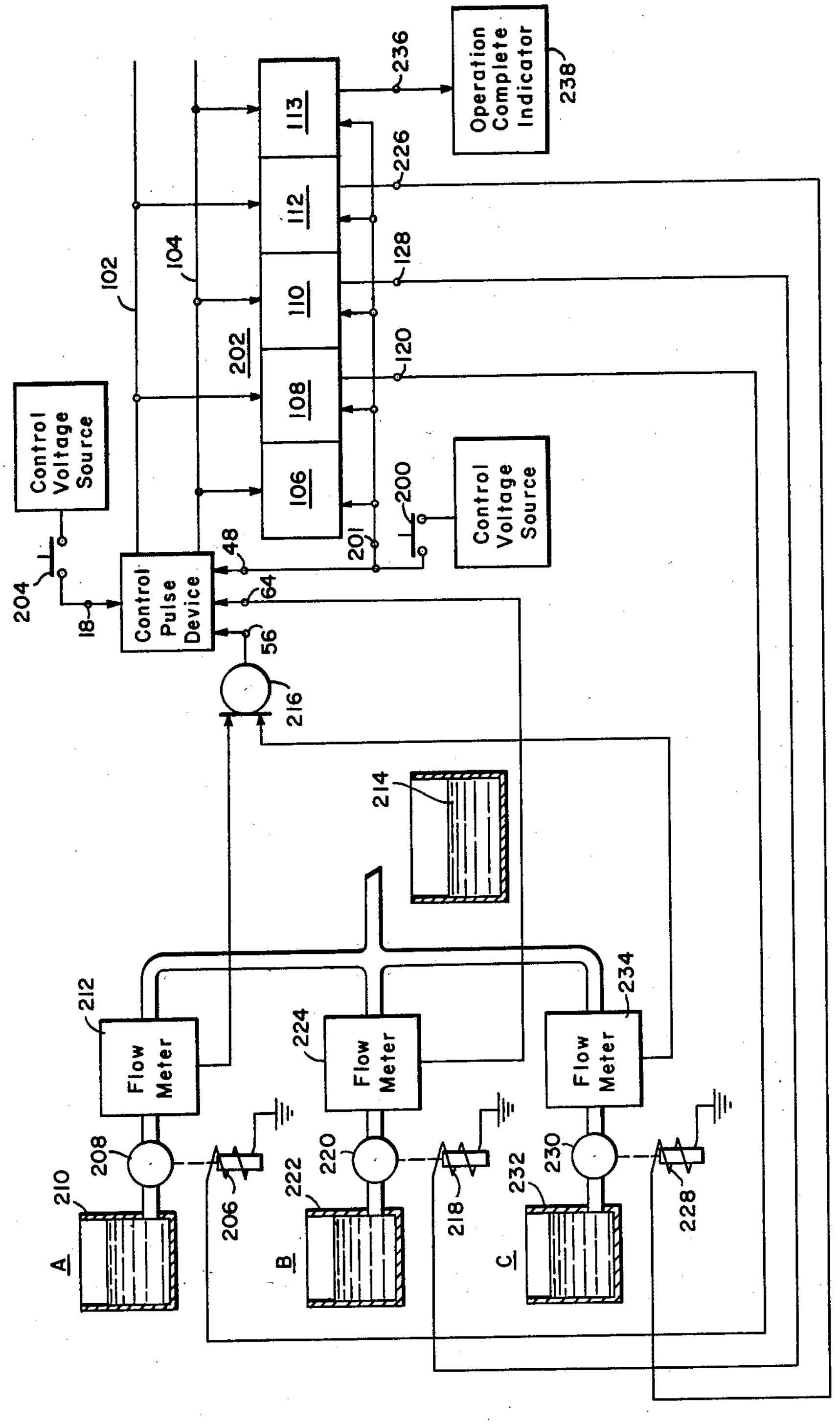
FIG. 3 is a diagrammatic showing of one example of an application of the present pulse signal providing apparatus, for controlling the blending of a plurality of fluids.

In the operation of the control apparatus as shown in FIG. 3, the reset control button 200 is first closed to apply a one value control signal to terminal 201 for resetting the operative state of each of the counting stages within the pulse counter apparatus 202 such that the first counting stage 106 is operating in its ON condition of operation and the remaining and successive four counting stages 108, 110, 112 and 113 are operating in their OFF condition of operation. The closing of the reset control button 200 further supplies a one value control signal to the terminal 48 and this establishes the operation of the control pulse driver device 100 such that a one value control signal is supplied to the conductor 102 and a similar control signal is not supplied to the conductor 104 by the driver device 100.

When it is desired to start the blending of fluid A, fluid B and fluid C, as will be later described, the manual advance control button 204 is closed to supply a one value control signal to terminal 18 and causing a "step upon one" operation of the driver device 100 such that a control signal is now supplied to the conductor 104 and a control signal is not supplied to the conductor 102. This causes the control gate 118 shown in FIGURE 2 and connected between the first counting stage 106 and the second counting stage 108 within the pulse counter device 202 to permit the transfer of information from the first counting stage 106 to the second counting stage 108. Since the one value control signal is now supplied to the conductor 104, it causes the control gate 126 shown in FIGURE 2 and connected between the second counting stage 108 and the third counting stage 110 to prevent the transfer of information between the second and third counting stages. A one value output signal is now supplied by the second counting stage 108 through the terminal 120 to indicate that the count information is stored in the second counting stage. This output signal through any desired amplifying device not shown energizes a solenoid 206 operative with a control valve 208 causing fluid A from the tank 210 to flow through the flow meter 212 into a container 214. When a predetermined desired amount of fluid A passes through the flow meter 212, the latter flow meter 212 provides an output signal through an OR device 216 to energize the even to odd input terminal 56 of the driver device 100 causing a one value output signal to be supplied to the conductor 102 and no such output signal to be supplied to the conductor 104. This results in stored information being transferred from the second counting stage 108 to the third counting stage 110 such that a one value output signal is supplied through the terminal 128 to the solenoid 218 operative with the control valve 220 and allows fluid B to flow from the tank 222 through a flow meter 224 and into the container 214. When a predetermined and desired amount of fluid B has passed through the flow meter 224, the latter flow meter 224 provides an output signal to the odd to even control terminal 64 as shown in FIG. 1 of the driver device 100 and causes a one value output signal to be supplied to the conductor 104 and a similar output signal to not be supplied to the conductor 102.

This results in a transfer of stored information from the third counting stage 110 to the fourth counting stage 112 and provides an output signal through the terminal 226 which energizes a solenoid 228 operative with a control valve 230 for controlling the flow of fluid C from a container 232 through a flow meter 234 and into the container 214. When a predetermined and desired amount of fluid C has passed through the flow meter 234, the latter flow meter 234 provides an output signal through the OR device 216 to the even to odd input terminal 56 of the driver device 100, causing a one value output signal to be supplied to the conductor 102 and not to be supplied to the conductor 104. This results in the information stored within the counter stage 112 being transferred to the conuter stage 113 and causes an output signal to be supplied through terminal 236 to a suitable operation complete indicator device 238. In this regard, it should be noted that when the information stored within the second counter stage 108 transferred to the third counter stage 110, the output signal provided through the terminal 120 to the solenoid 206 was no longer provided such that the control valve 208 closed and prevented further passage of the fluid A from the container 210 into the container 214. Similarly, when the storage information passed from the third counter stage 110 to the fourth counter stage 112 the output signal was no longer provided through the terminal 128 to the solenoid 218 which allowed the valve 220 to close. When the storage information passed from the fourth counter stage 112 to the fifth counter stage 113, the output signal was no longer provided through the terminal 226 to the solenoid 228 which resulted in a closure of the control valve 230.

In the operation of the pulse signal providing apparatus as shown in FIG. 1, it should be noted that at no time did the situation occur when a one value control signal was not supplied to at least one of the terminals 38 and the terminal 42. If, for example, it is desired to reset the ring counter device shown in FIGURE 2 back to the initial state with the first counting stage 106 in the ON operating condition and all the other successive counting stages in the OFF operating condition, the reset to odd terminal 48 would be supplied with a one value control pulse causing the inversion device 36 to provide a one value output pulse to the terminal 38 and the conductor 102 as shown in FIG. 2. This would block the control gates such as the NOR element 118 between the odd counting stages and leading to the even counting stages and would unblock the control gate such as the NOR element 126 connected between the odd counting stages and the successive even counting stages. Thusly, any information stored in an even counting stage such as stage 108 would pass to the next successive odd counting stage such as the counting stage 110 and result in a reset of the pulse counter as shown in FIG. 2, in an odd one of its stages containing the stored information. Similarly, the reset to even terminal 52 as shown in FIG. 1 is operative to reset the pulse counter device as shown in FIG. 2 in a condition of operation wherein the information is stored in one of its even counting stages, such as, for example, the second counting stage 108 or the fourth counting stage 112.

It should be further noted that the power NOR elements 36 and 40 are operative as inversion devices and have a function similar to the well known NOT device as already known to persons skilled in the present art.

The signal pulse providing apparatus as shown in FIG. 1, in general, comprises a gate device or circuit 13 including the NOR elements 14 and 16, a MEMORY device 10, a second gate control circuit 25 including the NOR elements 22 and 24, and a second MEMORY device 12. Thusly, when each of the gate devices 13 and 25 are held in their closed or inhibited condition of operation, both of the MEMORIES are free to take up either of their two possible states of operation. However, if only the gate device 25 including the NOR elements 22 and 24 is opened then the second MEMORY device 12 becomes a slave of the first MEMORY device 10. Thusly, if the gate device 13 is opened by removing a one value control signal from the terminal 18, then the MEMORY device 10 assumes through the feedback connections 11 and 13, the operative state of the respective inversion devices 36 and 40. Now if the gate device 13 is closed and the gate device 25 including NOR elements 22 and 24 is opened, the MEMORY device 12 including the NOR elements 34 and 32 will assume the operative state that the MEMORY device 10 has. By crossing from the viewpoint of logic involved the feedback connections 9 and 11 coming from the output of the MEMORY device 12 to the input of the MEMORY device 10 due to the presence of the NOT or inversion devices 36 and 40, it causes a change of operative state in the MEMORY device 10 when the gate device 13 including NOR elements 14 and 16 is open. Thusly, each time an operative cycle of the signal providing apparatus as shown in FIG. 1 is completed, the MEMORY device 10 reverses itself.

The MEMORY device 12 includes the inversion devices 36 and 40 to assure the continuance of an output signal to at least one of the output terminals 38 and 42 at all times.

In the operation of the MEMORY device 10, for the purpose of illustration, if the NOR element 28 is providing an output signal and the NOR element 30 is not providing an output signal, when a one value step upon one control pulse is removed from the terminal 18, this effectively opens each of the NOR elements 14 and 16 such that, if for example, the inversion device 36 is providing a one value output signal and inversion device 40 is not providing a one value output signal, the output signal from the inversion device 36 is applied to the NOR element 14 to prevent it from having an output signal. The NOR element 16, however, since it is not receiving a one value output signal from the inversion device 40 and further at the present time is not receiving a one value control pulse from the terminal 18, provides a one value output signal to the NOR element 30, causing the NOR element 30 to change its operative stage such that it does not provide a one value output signal and the NOR element 28 does provide such an output signal. However, when the output signal from the NOR element 16 is applied to the input of the NOR element 30, the time period required for the NOR element 30 to no longer have a one value output signal until the NOR element 28 provides such an output signal, is in the order of two to five microseconds. Thusly, during this period of time, both of these outputs are momentarily at zero value.

With reference to the MEMORY device 12, utilizing relatively high power inversion devices 36 and 40, if these devices per se were utilized to provide a FLIP-FLOP or MEMORY device, the momentary zero value signal output period would be greater and perhaps in the order of 10 to 15 microseconds. The MEMORY device 12 in this regard is arranged to avoid any provision of no one value output signal to each of the output terminals 38 and 42 at the same time. Thusly, the NOR elements 32 and 34 within the MEMORY device 12 may in practice operate in a manner similar to the NOR elements 28 and 30 within the MEMORY device 10, such that each of the NOR elements 32 and 34 may momentarily for a period of two to five microseconds each provide a zero output signal. However, due to the operation of the inversion devices 36 and 40, when either one of the NOR elements 32 or 34 has a zero output signal its respective inversion device 40 or 36 will at this time have a one value output signal such that in the operation of the MEMORY device 12 including the inversion devices 36 and 40, there will occur a momentary time period in the order of 5 to 15 microseconds when one value output pulses are supplied to each of the terminals 38 and 42 before a change in the operative state of the MEMORY device 12 will occur. The NOR elements 44 and 46 in this regard are provided to furnish a reinversion as necessary to make the output signals from the inversion devices 36 and 40 of the proper polarity to supply to the inputs of the respective NOR elements 32 and 34.

It should be further noted that the inhibition operation provided by the terminal 74 shown in FIGURE 1 and operative with the NOR elements 22 and 24 in the gate circuit 25 connected between the MEMORY device 10 and the MEMORY device 12 is operative only relative to the step upon one operation as controlled by the one value control signal supplied to the terminal 18. The advance even to odd operation as provided through the terminal 56 is not affected by the inhibit operation provided through the terminal 74, nor is the advance odd to even operation provided through the terminal 64, nor is the reset to even and reset to odd operation as provided by the respective terminals 52 and 48.

Unless otherwise specified, it is intended throughout this specification, when the statement is made that an output signal is provided by some circuit element, that a one value or otherwise suitable value output signal is provided.

Although the invention has been described with a certain degree of particularity, it should be understood that the present disclosure has been made only by way of example and that numerous changes in the details of construction and the combination and arrangement of parts may be resorted to without departing from the scope and spirit of the present invention.

We claim as our invention:

1. In a pulse signal providing apparatus, the combination of a MEMORY device including at least a first NOR element and a second NOR element connected together such that when one of said first and second NOR elements has an output signal the other of said NOR elements does not have an output signal, at least one signal inversion device, with the output of at least one of said first and second NOR elements being connected to an input of the other of said first and said second NOR elements through one signal inversion device, and with the output of at least said one signal inversion device being operative as an output of said MEMORY device, and a control gate device connected to control the operation of said MEMORY device, with said gate device including a third NOR element having an output connected to one input of said first NOR element and a fourth NOR element having an output connected to one input of said second NOR element.

2. In pulse signal providing apparatus operative to provide an output signal when energized by an input signal, the combination of a MEMORY device including at least a first NOR element and a second NOR element connected together such that when one of said first and second NOR elements has an output signal the other of said NOR elements does not have an output signal, a signal inversion device, with the output of at least one of said first and second NOR elements being connected to an input of the other of said first and said second NOR elements through said signal inversion device, and with the output of said signal inversion device being operative to provide said output signal of said signal providing apparatus, and a control gate device connected to control the operation of said MEMORY device, with said gate device including at least a third NOR element having an output connected to one input of one of said first and second NOR elements and having an input adapted to be energized by said input signal.

3. In pulse signal providing apparatus operative to provide at least first and second output pulses of respectively opposite polarity, the combination of a MEMORY device including at least first and second NOR elements connected together such that when one of said NOR elements has an output signal the other of said NOR elements does not have an output signal, a pair of signal inversion devices, with each of said first and second NOR elements being connected through a different one of said inversion devices to the input of the other of said first and second NOR devices, with said first inversion device providing a first output pulse for said signal providing apparatus and with the second inversion device providing a second and opposite polarity output pulse for said signal providing apparatus, and a control gate device connected to control the operation of said MEMORY device, with said gate device including a third NOR element connected to control the operation of said first NOR element and a fourth NOR element connected to control the operation of said second NOR element.

4. In pulse signal providing apparatus operative to provide at least first and second output pulses, the combination of a MEMORY device including at least first and second NOR elements connected together such that when either one of said NOR elements has an output signal the other of said NOR elements does not have an output signal, at least one signal inversion device, with at least one of said first and second NOR elements being connected through said one inversion device to the input of the other of said first and second NOR devices, with said inversion device providing at least one of said first output pulse and said second output pulse, and a control gate device connected to control the operation of said MEMORY device, with said gate device including a third NOR element connected to an input of said first NOR element and a fourth NOR element connected to an input of said second NOR element.

5. In pulse signal providing apparatus operative to provide at least first and second output pulses of respectively opposite polarity, the combination of a MEMORY device including at least first and second NOR elements connected together such that when one of said NOR elements has an output signal the other of said NOR elements does not have an output signal, a pair of signal inversion devices, with each of said first and second NOR elements being connected through a different one of said inversion devices to the input of the other of said first and second NOR devices, with said first inversion device providing said first output pulse for said signal providing apparatus and with the second inversion device providing said second and opposite polarity output pulse for said signal providing apparatus, and a control gate device connected to control the operation of said MEMORY device, with said gate device including a third NOR element connected to control the operation of said first NOR element and a fourth NOR element connected to control the operation of said second NOR element, with said first inversion device being connected to provide an output pulse when said first NOR element is not providing an output signal to the input of said inversion device and with said second inversion device being connected to provide an output pulse when said second NOR element is not providing an output signal to the input of said second inversion device.

6. In pulse signal providing apparatus operative to provide at least first and second output pulses, the combination of a MEMORY device including at least first and second NOR elements connected together such that when either one of said NOR elements has an output signal the other of said NOR elements does not have an output signal, a pair of signal inversion devices, with each of said first and second NOR elements being connected through a different one of said inversion devices to the input of the other of said first first and second NOR devices, with said first inversion device providing said first output pulse and with the second inversion device providing said second output pulse, and a control gate device connected to control the operation of said MEMORY device, with said gate device including a third NOR element connected to control the operation of said first NOR element and a fourth NOR element connected to control the operation of said second NOR element, said first inversion device being connected to provide said first output pulse when said first NOR element is not providing an output signal to the input of said inversion device and with said second inversion device being connected to provide said second output pulse when said second NOR element is not providing an output signal to the input of said second inversion device.

7. In pulse signal providing apparatus, the combination of a first MEMORY device including at least first and second NOR elements connected together such that when one of said NOR elements has an output signal the other of said NOR elements does not have an output signal, a pair of signal inversion devices, with the output of each of said first and second NOR elements being connected through a different one of said signal inversion devices to the input of the other of said first and second NOR elements, a control gate device connected to control the operation of said first MEMORY device, with said gate device including a third NOR element connected to control the operation of said first NOR element and a fourth NOR element connected to control the operation of said second NOR element, and a second MEMORY device including at least fifth and sixth NOR elements, with the output of said fifth NOR element being connected to the input of said third NOR element and with the output of said sixth NOR element being connected to the input of said fourth NOR element, and with the output of said first NOR element being connected to the input of one of said fifth and sixth NOR elements and the output of said second NOR element being connected to the input of the other of said fifth and sixth NOR elements.

8. In pulse signal providing apparatus, the combination of a first MEMORY device including at least first and second NOR elements connected together such that when one of said NOR elements has an output signal the other of said NOR elements does not have an output signal, a pair of signal inversion devices, with an output of each of said first and second NOR elements being connected through a different one of said signal inversion devices to an input of the other of said first and second NOR elements, a control gate device connected to control the operation of said first MEMORY device, with said gate device including a third NOR element connected to control the operation of one of said first and second NOR elements and a fourth NOR element connected to control the operation of the other of said first and second NOR elements, and a second MEMORY device including at least fifth and sixth NOR elements, with the output of said fifth NOR element being connected to the input of said third NOR element and with the output of said sixth NOR element being connected to the input of said fourth NOR element, and with the output of said first NOR element being connected to the input of one of said fifth and sixth NOR elements and the output of said second NOR element being connected to the input of the other of said fifth and sixth NOR elements.

9. In pulse signal providing apparatus, the combination of a MEMORY device including at least a first NOR element and a second NOR element connected together such that when one of said first and second NOR elements has an output signal the other of said NOR elements does not have an output signal, a pair of signal inversion devices, with an output of each of said first and second NOR elements being connected to an input of the other of said first and said second NOR elements through a different one of said pair of signal inversion devices, and with the output of at least one of said signal inversion devices being operative as an output of said MEMORY device, and a control gate device connected to control the operation of said MEMORY device, with said gate device including a third NOR element having an output connected to one input of said first NOR element and a fourth NOR element having an output connected to one input of said second NOR element, with said pair of signal inversion devices comprising NOT devices, a fifth NOR element connected between the output of said first NOT signal inversion device and the input of the second NOR element, and a sixth NOR element being connected between the output of said second NOT signal inversion device and the input of said first NOR element.

10. In pulse signal providing apparatus, the combination of a MEMORY device including at least a first NOR element and a second NOR element connected together such that when one of said first and second NOR elements has an output signal the other of said NOR elements does not have an output signal, a pair of signal inversion devices, with the output of each of said first and second NOR elements being connected to an input of the other of said first and said second NOR elements through a different one of said pair of signal inversion devices, and with the output of at least one of said signal inversion devices being operative as an output of said MEMORY device, and a control gate device connected to control the operation of said MEMORY device, with said gate device including a third NOR element having an output connected on one input of one of said first and second NOR elements and a fourth NOR element having an output connected to one input of the other of said first and second NOR elements, with said pair of signal inversion devices including NOT devices, a fifth NOR element connected between the output of said first NOT device and the input of the second NOR element, and a sixth NOR element being connected between the output of said second NOT device and the input of said first NOR element.

11. In pulse signal providing apparatus, the combination of a MEMORY device including at least a first signal providing element and a second signal providing element connected together such that when one of said first and second signal providing elements has an output signal the other of said signal providing elements does not have an output signal, at least one signal inversion device, with the output of at least one of said first and second signal providing elements being connected to an input of the other of said first and said second signal providing elements through one signal inversion device, and with the output of at least said one signal inversion device being operative as an output of said memory device, and a control gate device connected to control the operation of said MEMORY device, with said gate device including a third signal providing element having an output connected to one input of said first signal providing element and a fourth signal providing element having an output connected to one input of said second signal providing element.

References Cited in the file of this patent

UNITED STATES PATENTS

| | | |
|---|---|---|
| Re. 23,770 | Bergfors | Jan. 12, 1954 |
| 2,545,924 | Johnstone | Mar. 20, 1952 |
| 2,583,587 | Milsom | Jan. 29, 1952 |
| 2,745,006 | Chu et al. | May 8, 1956 |
| 2,846,583 | Goldfischer et al. | Aug. 5, 1958 |
| 2,985,773 | Dobbie | May 23, 1961 |